United States Patent [19]
Muller

[11] 3,917,194
[45] Nov. 4, 1975

[54] AUTOMATICALLY OPERATING DEVICE FOR SEALING A FUSELAGE RECESS OF AIRCRAFTS

[75] Inventor: Gunther Muller, Krailling, Germany

[73] Assignee: Messerschmitt-Bolkow-Blohm GmbH, Munich, Germany

[22] Filed: Jan. 10, 1974

[21] Appl. No.: 432,400

Related U.S. Application Data

[62] Division of Ser. No. 287,268, Sept. 8, 1972, Pat. No. 3,797,784.

[30] Foreign Application Priority Data
Sept. 13, 1971  Germany.............................. 2145618

[52] U.S. Cl...................................... 244/46; 49/480
[51] Int. Cl.²............................................. B64C 3/40
[58] Field of Search ............ 244/46, 43, 45 A, 130, 244/131; 267/152; 49/480

[56] References Cited
UNITED STATES PATENTS
3,480,237  11/1969  Appleby................................ 244/46

FOREIGN PATENTS OR APPLICATIONS
832,181  4/1960  United Kingdom................... 244/43
2,011,345  9/1971  Germany .............................. 244/46

Primary Examiner—Trygve M. Blix
Assistant Examiner—Barry L. Kelmachter
Attorney, Agent, or Firm—Woodhams, Blanchard and Flynn

[57] ABSTRACT

Sealing device for an aircraft fuselage. For adjustable wing aircraft whose wings retract into the fuselage under certain conditions of flight there is provided a resilient sealing device at the upper and lower sides of the wing receiving recess for closing the recess and providing a smooth fuselage contour in all positions of the wing. The sealing devices each comprise a resilient tube arranged at each of the upper and lower edges of the recess and so proportioned to the size of the recess that they are pressed together under some appreciable pressure even when the wing is extended. In one form of the invention said sealing tube is comprised of spirally wound spring wire which if desired may be of multilayer construction, said multilayers being, if desired, wound in opposite directions. In other embodiments, the resilient tube may be enveloped by an elastic material for conforming the closure device to the contour of the aircraft.

2 Claims, 5 Drawing Figures

AUTOMATICALLY OPERATING DEVICE FOR SEALING A FUSELAGE RECESS OF AIRCRAFTS

This is a division of application Ser. No. 287,268, filed Sept. 8, 1972 now U.S. Pat. No. 3,797,784.

The invention relates to an automatically operating device for sealing a fuselage recess in aircraft, which fuselage recess serves to receive an airfoil component which can be retracted into the fuselage.

The sealing of the fuselage recess must be particularly good since a poor or an uneven sealing on the one hand has an undesirable effect on the aerodynamic resistance of the aircraft, which is particularly serious in high-speed aircraft, and on the other hand can result in reduction of the lift due to a change of the pressure conditions on the upper and lower side of the respective wing zone.

To attain the objective of sealing the fuselage recess of aircraft, it is already known to use a flexible, partially inflatable, bellows-like material for covering or sealing the fuselage recess.

A cover for a fuselage recess of aircraft for receiving a wing retractable into the fuselage which cover is developed according to this principle, is characterized by two flaps of a flexible, soft, air-resisting material, which aprons are each clamped at the upper or lower edges, respectively, of the fuselage recess, overlap one another with their free edges, and are reinforced on the inside of each by resilient inserts. Further, it is no longer novel to provide at the upper and at the lower edges of the fuselage recess individual, side-by-side positioned, inflatable or elastic air bags which seal the fuselage recess in swung-out condition of the airfoil and between which the airfoil can penetrate during its retraction into the fuselage recess. Furthermore bellows are known for sealing the fuselage recess, which bellows are comprised of individual, separate bellows units and which have an additionally glued-on protective sheathing, by which they hold their shape better and result in a smooth surface. The individual bellows units are connected to a fixed metallic air inlet. Finally, it has also been suggested to secure a one-piece air bellows unit on each of the upper and lower edges of the fuselage recess and arrange same in such a manner that they contact or partly overlap one another in the swung-out condition of the wing.

However, the covering of the fuselage recess by inflatable bellows has various disadvantages. First there exists the necessity of providing a special air supply with air inlet, check valves, safety devices against leaks in the bellows among others, all of which require space and are expensive, and secondly such an installation is generally unreliable in that the air supply can become interrupted. An additional disadvantage which complicates the construction of the aircraft consists in that the air supply unit of the aircraft must be planned for higher rates of air flow.

The basic purpose of the present invention is to avoid these disadvantages and to produce a device of the type mentioned above which offers with small requirements of weight and construction a safe and reliably operating sealing of the fuselage recess in all wing positions, which furthermore is capable of automatically adjusting to the various wing movements during flying and which can be compressed to a fraction of its freely unfolded extent. Such device is desirably independent of the air supply system so a loss of pressure therein will not result in an operation breakdown or a destroying of the bellows due to fluttering.

The purpose is attained according to the invention by securing two elastic elements respectively to each of the upper and lower edges of the fuselage recess, each of said elements consisting of one piece and advantageously comprising a metallic resilient tube.

Since the space available in the fuselage recess is limited, the spring deflection is as large as possible in relationship to the height of the recess. The invention suggests for this purpose that the resilient tube is comprised of wires which are coiled helically at a large inclination. This construction has the further advantage that the elastic element is deformable elastically uniformly on all sides, whereby its function does not depend on the direction of an applied force.

To increase the spring constant, a further development of the inventive thought provides that the resilient tube consists of several superposed wire layers. Said wire layers can be wound alternately in opposite direction, whereby the resilient tube becomes more uniform.

In order to keep the air resistance as low as possible, it is further suggested according to the invention to construct the resilient tube in such a manner that the surface facing the outside is contoured to the aircraft fuselage. The objective of reducing the air resistance can also be achieved within the scope of the invention by enclosing the resilient tube by an elastic material which has a cross-sectional shape differing from the cross section of the resilient tube.

Usually it will be desirable if the resilient tube is enclosed by a material, whose surface has a small degree of roughness.

To achieve a complete sealing of the fuselage recess in all wing positions, the installation of the resilient tubes which are enclosed by elastic material into the fuselage recess of the aircraft is done in such a manner that the said resilient tubes abut under an already existing elastic deformation prior to receiving the retractable airfoil portion.

The invention is diagrammatically explained in the drawings, in which.

Figure 1:
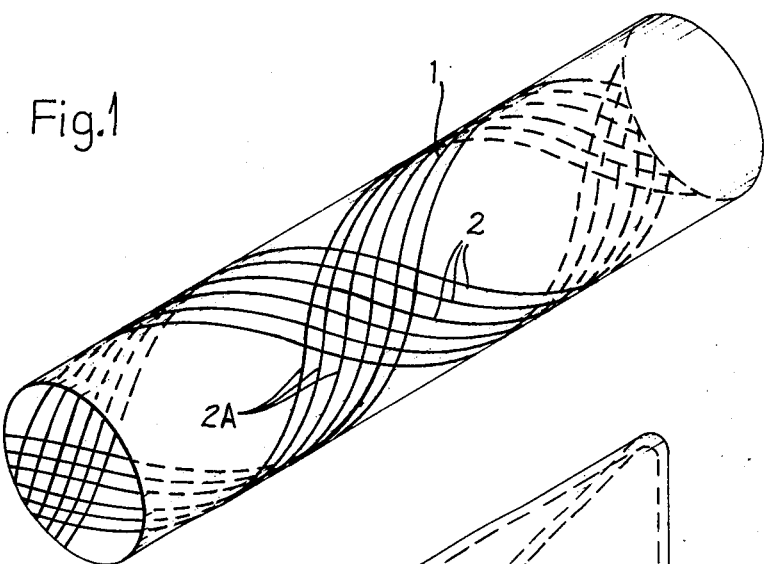
FIG. 1 illustrates a resilient tube which consists of helically coiled wires.

The resilient tube 1 illustrated in FIG. 1 has a circular cross section. Various spring wires 2 extend in form of a helix having a large pitch and, as a result, a very large inclination relative to the axis of the tube 1 on the surface of the cylinder. The large inclination of the spiral assures that upon a full compression of the tube a plastic deformation of the spring wires cannot occur.

Instead of one wire layer it is possible to arrange, one on top of the other, several layers of wire (as illustrated at 2A in FIG. 1). This increases the spring constant.

Figure 2:
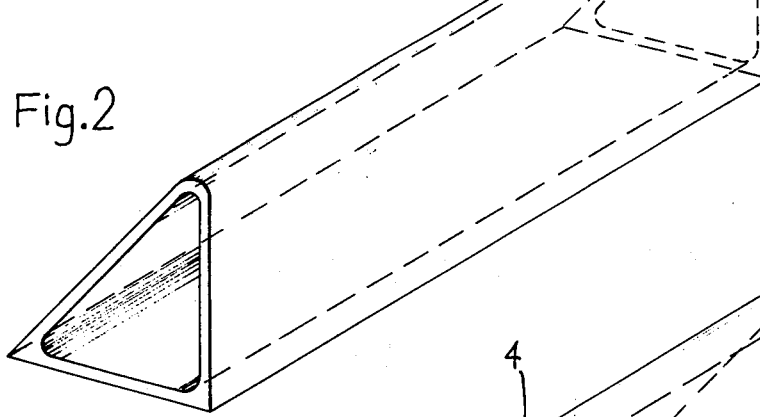
FIG. 2 illustrates a resilient tube with a triangular profile.

The resilient tube illustrated in FIG. 2 has a triangular profile to permit an adjustment of the tube to the outside contour of the aircraft. Since it is not easy in practice to manufacture the resilient tube in such a cross-sectional shape and to construct the surface in such a manner that the air resistance remains low, the invention provides a construction of the tube according to FIG. 3. Here the cylindrical resilient tube 3 is enclosed by a hollow elastic material 4. This material has a cross-sectional shape which differs from the cross section of the resilient cylindrical tube 1; in the case of FIG. 3, this is a triangular cross-sectional shape A-B-C or A'-B'-C', wherein the edge A—A' is rounded off. The rounding of the edge A—A' has the purpose of improving the cooperation of the upper and lower elastic element in the fuselage recess, as illustrated in FIGS. 4 and 5.

Figure 3:
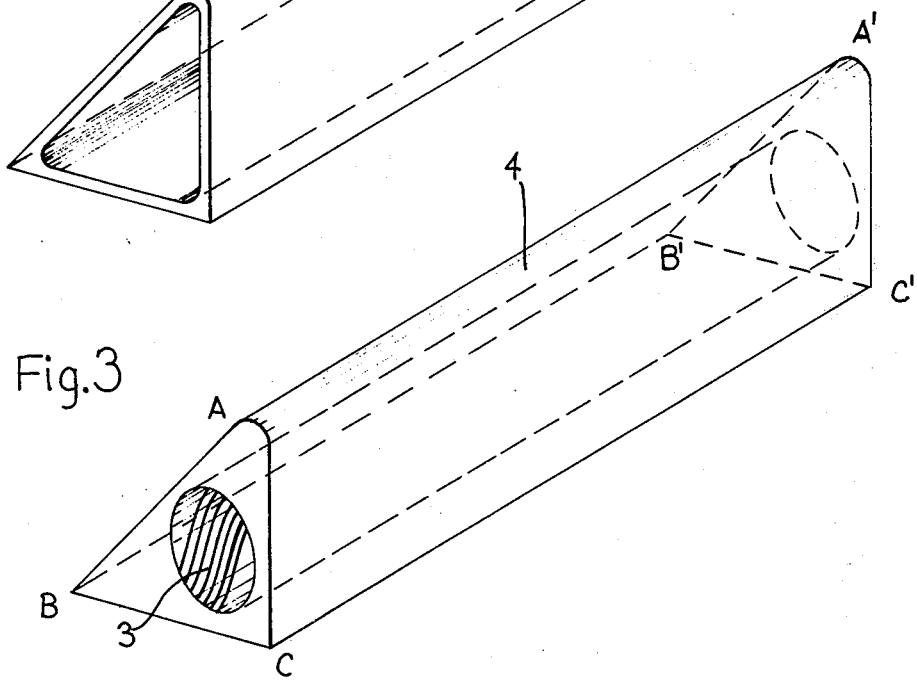
FIG. 3 illustrates a resilient tube which is enclosed by an elastic material.
Figure 4:
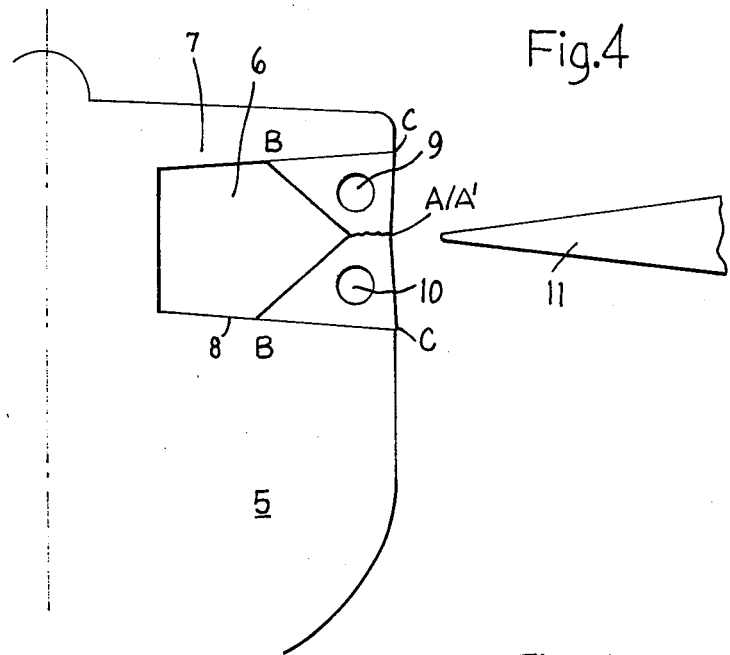
FIG. 4 illustrates the fuselage recess of an aircraft, which is sealed by two elastic elements.

In FIG. 4, the numeral 5 represents the fuselage of the aircraft, 6, the fuselage recess which has the upper side surface 7 and the lower side surface 8. The resilient tubes 9 and 10, shaped as illustrated in FIG. 3, are installed in the fuselage recess in such a manner that their rounded-off edges A—A' (according to FIG. 3) abut one another, whereby they each abut with one side surface (edge B–C) the upper or lower respective side surfaces of the fuselage recess.

Figure 5:
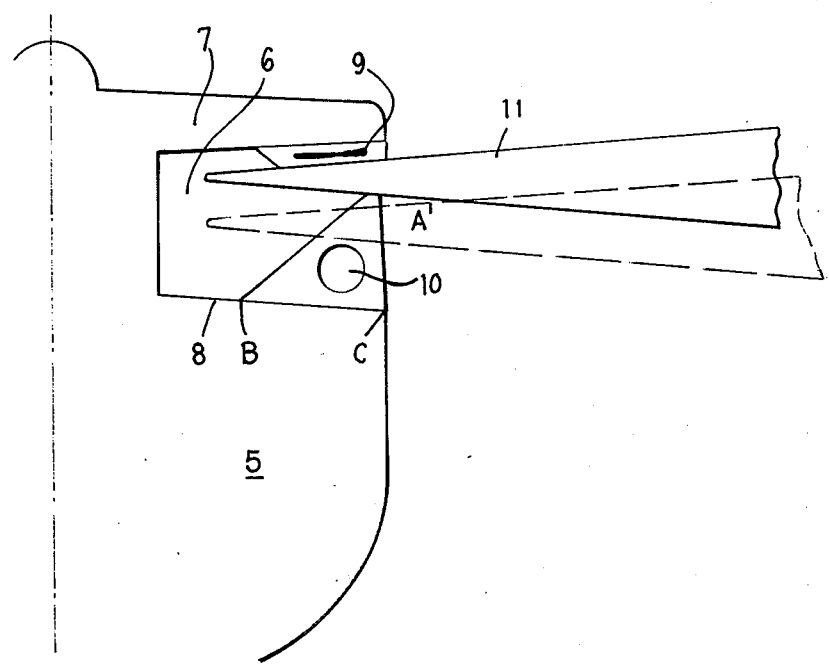
FIG. 5 illustrates a fuselage recess according to FIG. 4 into which a portion of the support wing has penetrated.

In FIG. 5, the fuselage recess is illustrated after penetration of the rear portion 11 of a wing into the fuselage recess. Here it is shown that the resilient tube 9 is compressed to a minimum size, while the resilient tube 10 just barely abuts the lower part of the wing rear portion 11 so that on both sides of the wing portion 11 a sufficient seal is provided.

The embodiments of the invention in which an exclusive property or privilege is claimed are defined as follows:

1. A sealing apparatus for use on aircraft having a fuselage and wings whose sweep-back can be varied, the trailing edges of said wings entering into sidewardly opening slots in the sides of said fuselage as the angle of sweep-back is increased, each of said slots having an upper wall, a lower wall and an inner wall spaced inwardly of said aircraft from outer edges of said slot, said sealing apparatus including a sealing arrangement in each of said slots, comprising the improvement wherein each of said sealing arrangements includes a pair of vertically spaced, elongated, hollow and noninflatable elastic elements having continuous and uninterrupted triangularly-shaped external surface, the hollow interior of said elastic elements being triangularly-shaped so that said elastic elements have a uniform wall thickness, one of said elastic elements being secured to said upper wall and the other of said elastic elements being secured to said lower wall, said vertically spaced pair of elastic elements engaging each other throughout their length and being slightly elastically deformed by (1) said engagement with each other and (2) an engagement with said wings of said aircraft.

2. A sealing apparatus for use on aircraft having a fuselage and wings whose sweep-back can be varied, the trailing edges of said wings entering into sidewardly opening slots in the sides of said fuselage as the angle of sweep-back is increased, each of said slots having an upper wall, a lower wall and an inner wall spaced inwardly of said aircraft from outer edges of said slot, said sealing apparatus including a sealing arrangement in each of said slots, comprising the improvement wherein each of said sealing arrangements includes a pair of vertically spaced, elongated, hollow and noninflatable elastic elements having a continuous and uninterrupted triangularly-shaped external surface, the hollow interior of said elastic elements being triangularly-shaped so that said elastic elements have a uniform wall thickness, one of said elastic elements being secured to said upper wall and the other of said elastic elements being secured to said lower wall, each of said triangularly-shaped elastic elements has at least one sharp angled corner adjacent an outside edge thereof when secured to one of the upper and lower walls and a rounded corner, said rounded corners on said pair of elastic elements engaging each other so that outside facing surfaces of said elastic elements are contiguous with an external contour of the aircraft fuselage, said vertically spaced pair of elastic elements engaging each other throughout their length and said elastic elements being slightly elastically deformed by (1) said engagement with each other and (2) an engagement with said wings of said aircraft.

* * * * *